(12) United States Patent
Doda et al.

(10) Patent No.: US 11,954,309 B2
(45) Date of Patent: Apr. 9, 2024

(54) SYSTEMS FOR PREDICTING A TERMINAL EVENT

(71) Applicant: Adobe Inc., San Jose, CA (US)

(72) Inventors: Amit Doda, Bangalore (IN); Gaurav Sinha, Bangalore (IN); Kai Yeung Lau, Seattle, WA (US); Akangsha Sunil Bedmutha, San Mateo, CA (US); Shiv Kumar Saini, Bangalore (IN); Ritwik Sinha, Cupertino, CA (US); Vaidyanathan Venkatraman, Fremont, CA (US); Niranjan Shivanand Kumbi, Fremont, CA (US); Omar Rahman, San Jose, CA (US); Atanu R. Sinha, Bangalore (IN)

(73) Assignee: Adobe Inc., San Jose, CA (US)

( * ) Notice: Subject to any disclaimer, the term of this patent is extended or adjusted under 35 U.S.C. 154(b) by 971 days.

(21) Appl. No.: 16/866,261

(22) Filed: May 4, 2020

(65) Prior Publication Data
US 2021/0342649 A1 Nov. 4, 2021

(51) Int. Cl.
*G06F 17/18* (2006.01)
*G06F 3/0481* (2022.01)
(Continued)

(52) U.S. Cl.
CPC ........ *G06F 3/04842* (2013.01); *G06F 3/0481* (2013.01); *G06F 11/079* (2013.01);
(Continued)

(58) Field of Classification Search
CPC ............. G06F 3/04842; G06F 18/2163; G06F 18/2113; G06F 18/2431; G06F 18/241; G06F 3/0481; G06F 17/18; G06N 20/00
See application file for complete search history.

(56) References Cited

U.S. PATENT DOCUMENTS 10,353,764 B1 * 7/2019 Cazzanti ............... H04L 41/149
2015/0363925 A1 * 12/2015 Shibuya ............... G06V 10/761
345/440

(Continued)

OTHER PUBLICATIONS

"The CMO Survey—Highlights and Insights Report", Aug. 2019, 73 pages.

(Continued)

*Primary Examiner* — Beau D Spratt
(74) *Attorney, Agent, or Firm* — FIG. 1 Patents

(57) ABSTRACT

In implementations of systems for predicting a terminal event, a computing device implements a termination system to receive input data defining a period of time and a maximum event threshold. This system uses a classification model to generate event scores for a plurality of entity devices. Each of the event scores indicates a probability of an event occurrence for a corresponding entity device within a period of time. The plurality of entity devices are segmented into a first segment and a second segment based on an event score threshold. Entity devices included in the first segment have event scores greater than the event score threshold and entity devices included in the second segment have event scores below the event score threshold. The termination system generates an indication of a probability that a number of event occurrences for the entity devices included in the second segment exceeds the maximum even threshold within the period of time.

20 Claims, 11 Drawing Sheets

(51) Int. Cl.
  *G06F 3/04842*  (2022.01)
  *G06F 11/07*  (2006.01)
  *G06F 18/21*  (2023.01)
  *G06F 18/2113*  (2023.01)
  *G06F 18/241*  (2023.01)
  *G06F 18/2431*  (2023.01)
  *G06N 20/00*  (2019.01)

(52) U.S. Cl.
  CPC .......... *G06F 17/18* (2013.01); *G06F 18/2113* (2023.01); *G06F 18/2163* (2023.01); *G06F 18/241* (2023.01); *G06F 18/2431* (2023.01); *G06N 20/00* (2019.01)

(56) References Cited

U.S. PATENT DOCUMENTS

| | | | |
|---|---|---|---|
| 2015/0371163 A1* | 12/2015 | Noh | G06Q 10/0635 705/7.28 |
| 2018/0096372 A1* | 4/2018 | Rickard, Jr. | G06N 5/01 |
| 2022/0269259 A1* | 8/2022 | Albrecht | G06Q 50/04 |
| 2023/0023646 A1* | 1/2023 | Xu | H04L 41/16 |

OTHER PUBLICATIONS

Liu, "A Semi-Supervised and Inductive Embedding Model for Churn Prediction of Large-Scale Mobile Games", Oct. 10, 2018, 10 pages.

* cited by examiner

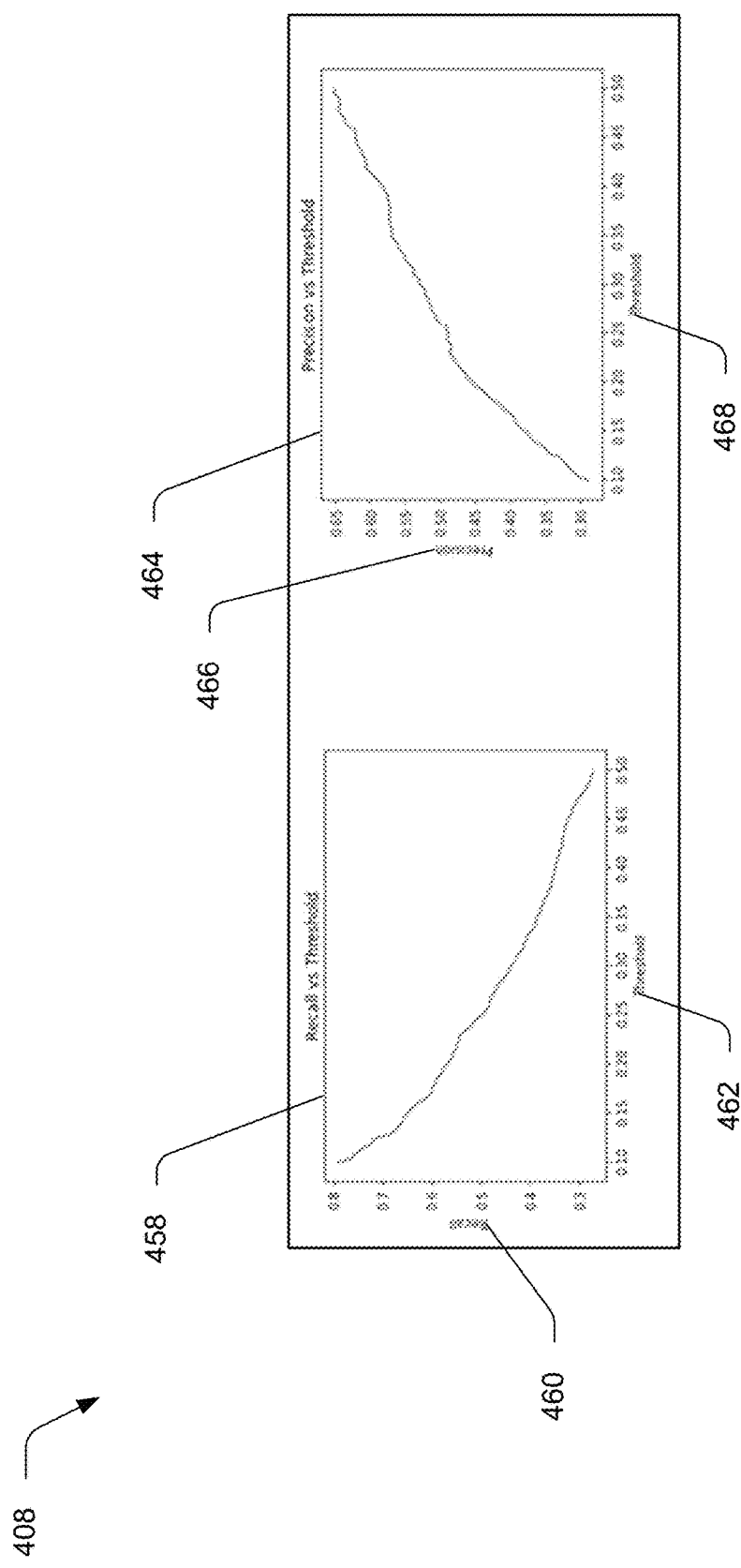

SYSTEMS FOR PREDICTING A TERMINAL EVENT

BACKGROUND

Digital analytics systems are implemented to analyze "big data" (e.g., petabytes of data) to gain insights that are not possible to obtain solely by human users. In one such example, digital analytics systems are configured to analyze big data to predict occurrence of future events which may support a wide variety of functionality. Prediction of future events, for instance, may be used to determine when a machine failure is likely to occur, how a disease may spread through a geographic region (e.g., to address spikes in resource usage), and so forth.

In other examples, this may be used to predict events involving user actions. Accurate prediction of user actions may be used to manage provision of digital content and resource allocation by service provider systems and thus improve operation of devices and systems that leverage these predictions. Examples of techniques that leverage prediction of user actions include recommendation systems, digital marketing systems (e.g., to cause conversion of a good or service), systems that rely on a user's propensity to purchase or cancel a contract relating to a subscription, likelihood of downloading an application, and so forth. Thus, prediction of future events may be used by a wide variety of service provider systems for personalization, customer relation/success management, etc.

Conventional techniques used to predict a terminal event, for example, a failure of a device, employ machine learning models such as convolutional neural networks and/or recurrent neural networks trained using training data to predict the terminal event. These systems are computationally expensive and may not be suitable for implementation on many online platforms. Additionally, these conventional systems are limited to generating predictions for terminal events based on the training data used to train the systems. Thus, conventional systems may not be able to accurately predict terminal events in scenarios which significantly differ from scenarios described by the training data.

SUMMARY

Systems and techniques are described for predicting a terminal event. In an example, a computing device implements a termination system to receive a user input defining a period of time and a maximum event threshold. The termination system uses a classification model to generate event scores for a plurality of entity devices. Each of the event scores indicates a probability of an event occurrence for a corresponding entity device of the plurality of entity devices within the period of time. In one example, an event score can indicate a probability of a corresponding entity device failing within the period of time. In another example, an event score can indicate a probability of a termination of a subscription associated with a corresponding entity device within the period of time.

The termination system leverages the event scores and an event score threshold to segment the plurality of entity devices into a first segment and a second segment. For example, entity devices included in the first segment have event scores above the event score threshold and entity devices included in the second segment have event scores below the event score threshold. The termination system generates an indication of a probability that a number of event occurrences for the entity devices included in the second segment exceeds the maximum event threshold within the period of time.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIGS. 4A, 4B, 4C, 4D, and 4E are example representations of precision and recall of systems for predicting a terminal event.

DETAILED DESCRIPTION

Overview

Figure 1:
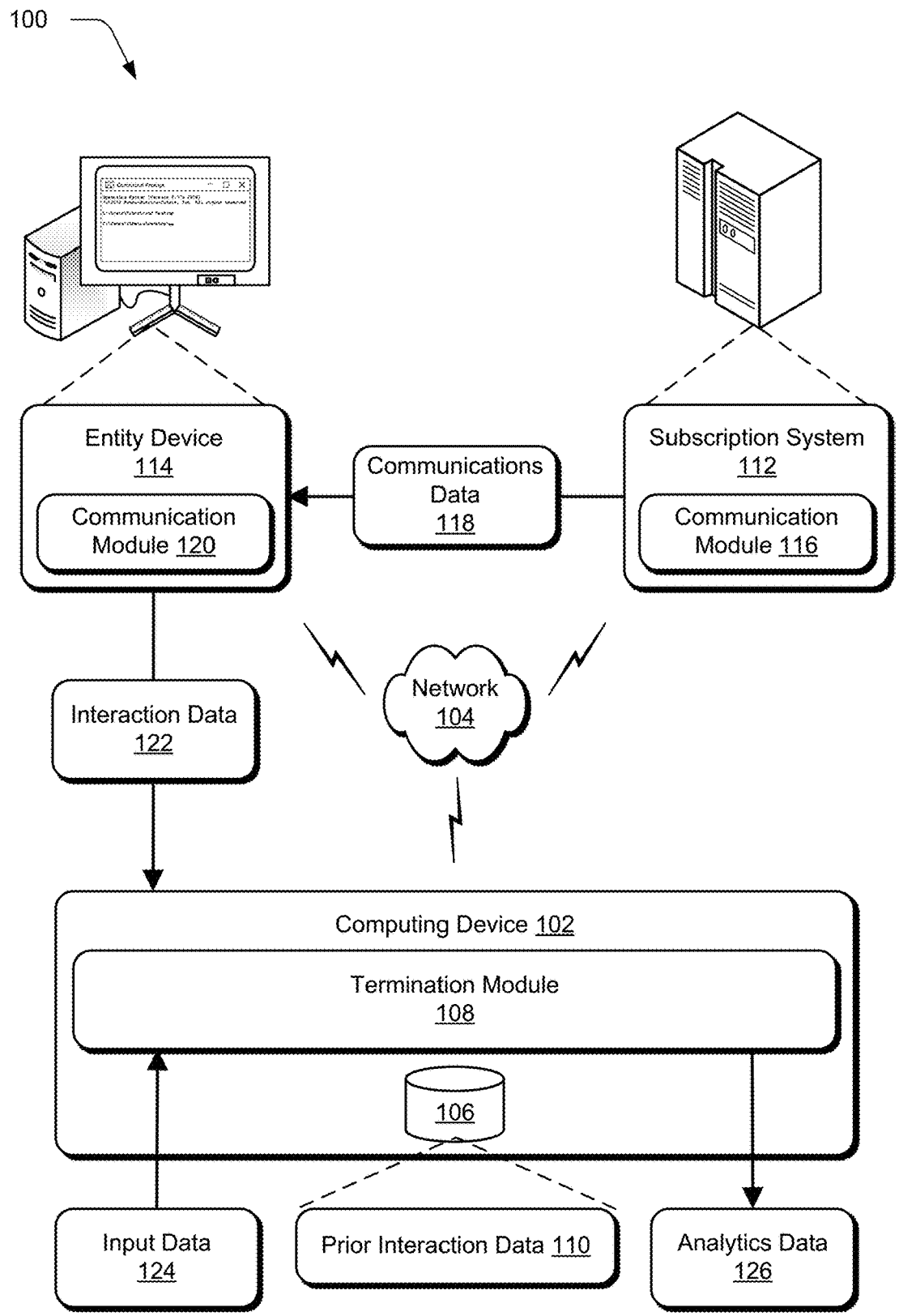
FIG. 1 is an illustration of an environment in an example implementation that is operable to employ digital systems and techniques for predicting a terminal event as described herein.

Conventional systems for predicting a terminal event rely on convolutional neural networks and/or recurrent neural networks trained using training data to generate predictions. These systems, however, use significant computational resources to generate the predictions. As a result of this resource consumption, conventional systems are generally not suitable for online applications.

To overcome these limitations, systems and techniques are described for predicting a terminal event. In an example, a computing device implements a termination system to receive a user input defining a period of time and a maximum event threshold. For example, the period of time can be a day, a week, two weeks, etc. The maximum event threshold indicates an upper limit for a number of event occurrences during the period of time.

The termination system uses a classification model to generate event scores for a plurality of entity devices. For example, each of the event scores indicates a probability of an occurrence of an event for a corresponding entity device of the plurality of entity devices within the period of time. Examples of the occurrence of the event for the corresponding entity device can include a failure of the entity device, a retirement of the entity device, a replacement of the entity device, a termination of a service associated with the entity device, and so forth.

The classification model is trained to generate the event scores for the plurality of entity devices using training data. For example, the classification model can include a logistic regression model, a random forest model, an XGBoost model, and so forth. In one example, the training data describes interactions of training entity devices. In another example, the training data includes a subset of interaction data describing interactions of the training entity devices.

The termination system leverages the event scores and an event score threshold to segment the plurality of entity devices into a first segment and a second segment. For example, entity devices included in the first segment have event scores above the event score threshold and entity devices included in the second segment have event scores below the event score threshold. The event score threshold defines a segment criterion and this can be defined in the user input or the event score threshold can be determined by termination system. In this example, entity devices included in the second segment have a lower probability of an occurrence of an event than entity devices included in the first segment.

The termination system generates a probability that a number of event occurrences for the entity devices included in the second segment exceeds the maximum event threshold during the period of time. Thus, this probability describes a likelihood that the number of event occurrences for entity devices having event scores below the event score threshold exceeds the upper limit for the number of event occurrences during the period of time. The termination system can use the probability and/or the event scores to support a variety of functionality. For example, the termination system can also generate an average number of event occurrences for the entity devices included in second segment during the period of time. This average number can be expressed as a number of entity devices or as a percentage of the entity devices included in the second segment.

Consider an example in which the entity devices are data storage devices and an occurrence of an event is a failure of an entity device. In this example, the user input defines a period of time equal to one week, an event score threshold equal to 10 percent, and a maximum event threshold of 5 percent. Accordingly, the entity devices included in the second segment have less than a 10 percent probability of failure within the following week.

Continuing this example, a data storage service which uses the entity devices can tolerate a failure of up to 5 percent of the entity devices included in the second segment within the following week. The termination system generates an indication of a 0.03 percent probability that a number of failure occurrences for the entity devices included in the second segment exceeds 5 percent of the entity devices within the following week. The termination system also generates an indication of an average number of failure occurrences of the entity devices as 0.2 percent of the devices or 3.8 entity devices within the following week.

The described systems and techniques improve computer-based technology for predicting events. Unlike conventional systems which are computationally expensive, the described systems accurately predict events using a minimal amount of training data. For example, the described systems may use a single time period of training data which improves computational efficiency of the described systems relative to the computationally expensive conventional systems. Because of this, the classification model can be frequently trained and retrained at any periodicity, e.g., daily, weekly, biweekly, etc. In some examples, the classification model can be trained on training data based on user inputs such as inputs which define a periodicity for training the model. By generating event scores for each of a plurality of entity devices, the described systems support additional functionality such as decision threshold filtering based on the event score threshold and/or the maximum event threshold which is not possible using conventional techniques.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques for generating recommendations as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The computing device 102 includes a storage device 106 and a termination module 108. The termination module 108 is illustrated as having, transmitting, and/or receiving prior interaction data 110 that describes prior interactions of a plurality of entities with communications sent as part of an entity-to-entity subscription service. As shown, the illustrated environment 100 includes a subscription system 112 and an entity device 114 which are also connected to the network 104. Although a single subscription system 112 and a single entity device 114 are shown, it is to be understood that the subscription system 112 may be representative of multiple subscription systems 112 and the entity device 114 may be representative of multiple entity devices 114. For example, the entity device 114 includes functionality that enables multiple entities to interact with communications sent to the multiple entities as part of an entity-to-entity subscription service.

The subscription system 112 includes a communication module 116 and the subscription system 112 implements the communication module 116 to send communications data 118 over the network 104. The communications data 118 describes digital communications such as e-mail communications, text message communications, social media communications, etc. In one example, the subscription system 112 sends the communications data 118 via the network 104 as part of an entity-to-entity subscription service.

The entity device 114 is illustrated to include a communications module 120. In one example, the entity device 114 implements the communications module 120 to receive the communications data 118 and the entity device 114 processes the communications data 118 to facilitate interaction with the digital communications. In this way, an entity associated with the entity device 114 can interact with communications described by data included as part of the communications data 118. For example, the entity associated with the entity device 114 may receive the communications data 118 as part of the entity-to-entity subscription service.

As shown, the computing device 102 receives interaction data 122 via the network 104. The interaction data 122 describes interactions of the entity associated with the entity device 114 with the digital communications described by the communications data 118. Consider an example in which the subscription system 112 sends the communications data 118 to the entity device 114 as part of the entity-to-entity subscription service. In this example, the communications data 118 describes an e-mail communication and the entity associated with the entity device 114 can interact with the e-mail communication. Examples of types of these interactions include the e-mail communication is sent, the e-mail communication is delivered, the e-mail communication is opened, and a hyperlink included in the e-mail communication is clicked. For example, the interaction data 122 may describe these types of interactions such as numbers of the types of interactions and how recently the types of interactions occurred, etc.

The computing device 102 receives the interaction data 122 and the computing device 102 implements the termination module 108 to update the prior interaction data 110. To do so, the termination module 108 processes the interaction data 122 and includes the interactions described by the interaction data 122 in the prior interaction data 110. In some examples, the termination module 108 incorporates the interaction data 122 into the prior interaction data 110 in substantially real time as the computing device 102 receives the interaction data 122. In other examples, the termination module 108 updates the prior interaction data 110 periodically such as daily, weekly, biweekly, etc.

As shown, the termination module 108 receives input data 124 that describes user inputs such as may be received from an administrator of the subscription system 112 in one example. For example, the input data 124 can include inputs defining a time period for predicting termination of the entity-to-entity subscription service by the entity associated with the entity device 114. As noted previously, the entity device 114 can be representative of a plurality of entity devices 114. Thus, the input data 124 can include user inputs defining a period of time for predicting termination of the entity-to-entity subscription service by a plurality of entities that may receive communications as part of the entity-to-entity subscription service.

In another example, the input data 124 describes a user input that defines an event score threshold which is an indication of which entities of a plurality of entities receive communications as part of the entity-to-entity subscription service. For example, entities determined to have a probability of terminating the entity-to-entity subscription service within the period of time that is greater than the event score threshold do not receive communications as part of the subscription service. In one example, entities determined to have a probability of terminating the entity-to-entity subscription service that is greater than the event score threshold do not receive these communications because the determined entities may be considered too likely to terminate the entity-to-entity subscription service to justify sending these entities the communications. In an additional example, the input data 124 describes a user input that defines a maximum event threshold that indicates an acceptable level of terminations of the entity-to-entity subscription service within the period of time.

The termination module 108 receives the input data 124 and processes the input data 124 and/or the prior interaction data 110 to generate analytics data 126. The analytics data 126 describes information related to the entity-to-entity subscription service. In one example, the analytics data 126 describes an indication of a termination of the entity-to-entity subscription service by the entity associated with the entity device 114 (e.g., within the period of time included as part of the input data 124). In another example, the analytics data 126 describes an indication of an average number of entities of the entities receiving communications that will terminate the entity-to-entity subscription service within the period of time. In this example, the analytics data 126 describes an average number of event occurrences for entity devices 114 within the period of time.

In an additional example, the analytics data 126 describes an indication of a probability that a number of entities receiving the communications and that terminate the entity-to-entity subscription service during the period of time will exceed the maximum event threshold. In this example, the analytics data 126 describes a probability that a number of event occurrences for entity devices 114 receiving the communications exceeds the maximum event threshold. Thus, the analytics data 126 can describe a likelihood that the number of event occurrences exceeds an acceptable number of event occurrences.

The analytics data 126 is usable to improve the entity-to-entity subscription service. For example, indications of the analytics data 126 are rendered in a user interface and aspects of the entity-to-entity subscription service can be modified based on the indications of the analytics data 126. Examples of such modifications may include changing the substance of the communications sent by the subscription service to entities determined to be likely to terminate the entity-to-entity subscription service during the period of time, changing a frequency at which communications are sent to entities determined to be likely to terminate the entity-to-entity subscription service during the period of time, etc. In one example, indications of the modifications can be included as part of the input data 124 and communicated to the subscription system 112 by the computing device 102 via the network 104. In another example, indications of the modifications to the entity-to-entity subscription service can be communicated directly to the subscription system 112.

Figure 2:
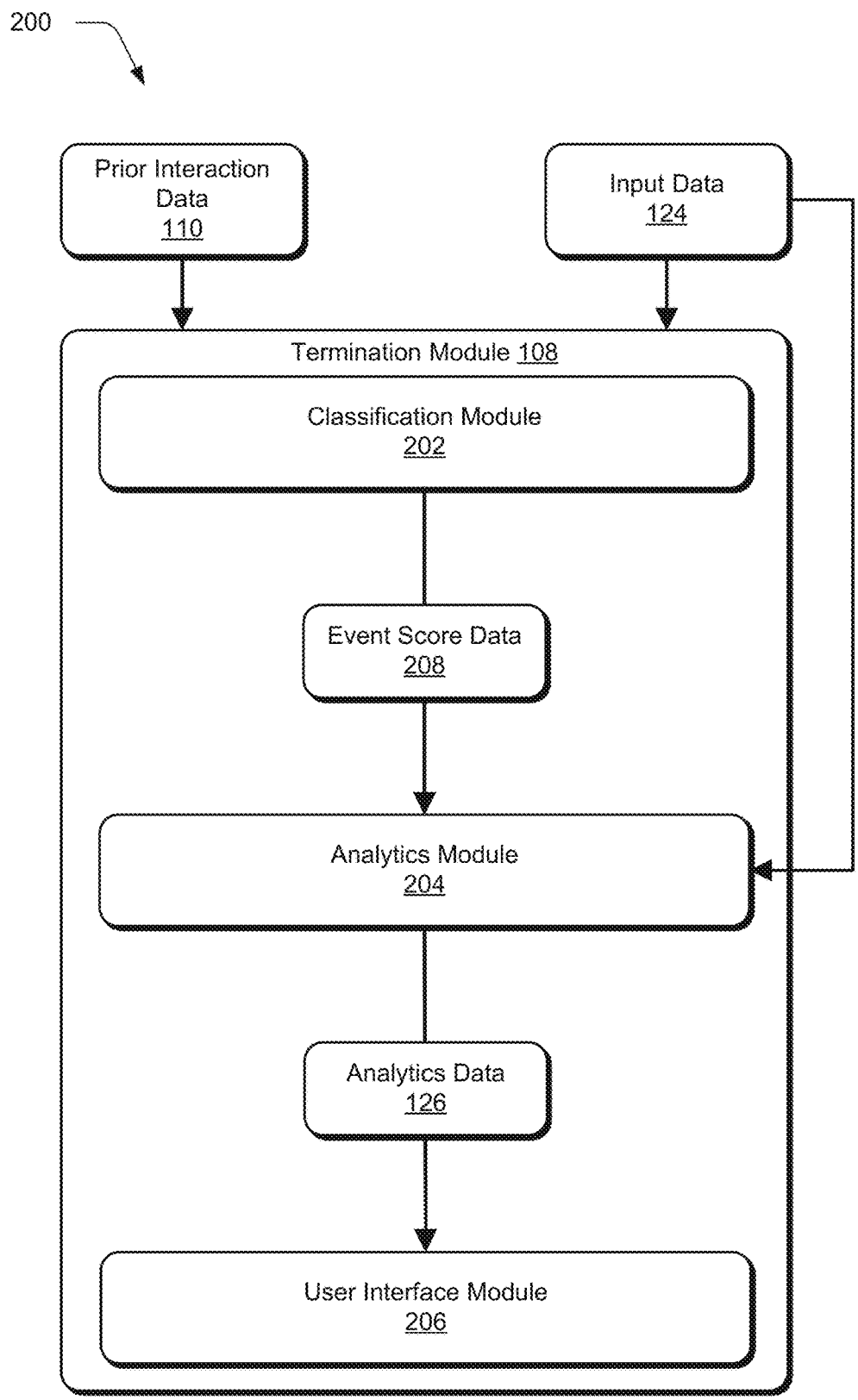
FIG. 2 depicts a system in an example implementation showing operation of a termination module for predicting a terminal event.

FIG. 2 depicts a system 200 in an example implementation showing operation of a termination module 108. The termination module 108 is illustrated to include a classification module 202, an analytics module 204, and a user interface module 206. As shown, the termination module 108 receives the prior interaction data 110 and the input data 124 as inputs. For example, the classification module 202 receives the prior interaction data 110 and the input data 124. The classification module 202 processes the prior interaction data 110 and the input data 124 to generate event score data 208.

The event score data 208 describes event scores for a plurality of entities that receive communications from an entity-to-entity subscription service. These event scores are indications of probabilities of termination of the entity-to-entity subscription service by each of the plurality of entities during a period of time. For example, the event score data 208 includes event scores at an individual entity level which enables filtering such as decision threshold based filtering.

In this manner, the event score data 208 describes an event score for each entity associated with the entity-to-entity subscription service during a period of time. In one example, the period of time can be defined as part of the input data 124. For example, the input data 124 may define the period of time as one day, one week, two weeks, etc. In another example, the period of time may be specific to the entity-to-entity subscription service. In this example, the entity-to-entity subscription service may send communications to the plurality of entities on a periodic basis such as one communication per week. Continuing this example, the period of time can correspond to a multiple of the periodic basis (e.g., three weeks).

As shown, the analytics module 204 receives the event score data 208 and the input data 124. The analytics module processes the event score data 208 and/or the input data 124 to generate analytics data 126. Consider an example in which the input data 124 includes an event score threshold that defines which entities of the plurality of entities receive communications as part of the entity-to-entity subscription service. For example, entities having event scores above the event score threshold do not receive communications while entities having event scores below the event score threshold receive communications as part of the entity-to-entity subscription service.

Continuing the previous example, the analytics module 204 processes the event score data 208 and the input data 124 to generate the analytics data 126 which may describe an approximated average number of terminations of the entity-to-entity subscription service by entities receiving communications based on the event score threshold. Consider an example in which the input data 124 defines the event score threshold as 10 percent. In this example, entities having event scores greater than 10 percent may not receive communications as part of the entity-to-entity subscription service. However, entities having event scores less than 10 percent may receive these communications and the analytics module 204 can be implemented to estimate an average number of terminations of the entity-to-entity subscription service by the entities having the event scores of less than 10 percent. For example, the analytics module 204 generates the analytics data 126 to include an indication of this estimate. In one example, the analytics data 126 also includes a confidence interval which expresses a confidence in the estimate of the average number of terminations of the entity-to-entity subscription service by the entities receiving the communications.

Consider another example in which the input data 124 defines the event score threshold and a maximum event threshold that indicates an acceptable level of terminations of the entity-to-entity subscription service. The acceptable level of terminations describes a rate of terminations of the entity-to-entity subscription service which can be tolerated based on information specific to the entity-to-entity subscription service. Consider an example in which the input data 124 defines the event score threshold as 10 percent and the maximum event threshold as 5 percent. In this example, the analytics module 204 generates the analytics data 126 to describe an indication of a probability that a number of entities receiving communications that terminate the entity-to-entity subscription service within the period of time will not exceed 5 percent. It is to be appreciated that the analytics module 204 may generate the analytics data 126 to describe an indication of a probability that a number of entities receiving communication that terminate the entity-to-entity subscription service within the period of time will exceed 5 percent.

For an event score threshold a and an average number of terminations of the entity-to-entity subscription service based on the threshold a defined as $\hat{P}_u(a)$, a sample estimate $\hat{p}_u(a)$ may be expressed as:

$$\hat{p}_u(a) = \Sigma_{\hat{p}_i < a} \hat{p}_i / \Sigma_{i=1}^n I(\hat{p}_i < a)$$

where: $\hat{p}_u(a)$ is an average number of terminations of the entity-to-entity subscription service for event score threshold a.

The distribution of the average number of terminations may be expressed as:

$$\hat{P}_u(a) \sim N\left(\hat{p}_u(a), \frac{\sum_{\hat{p}_i < a} \hat{p}_i * (1 - \hat{p}_i)}{\left(\sum_{i=1}^n I(\hat{p}_i < a)\right)^2}\right)$$

where:

$$\frac{\sum_{\hat{p}_i < a} \hat{p}_i * (1 - \hat{p}_i)}{\left(\sum_{i=1}^n I(\hat{p}_i < a)\right)^2}$$

is the variance ($\sigma^2$) of the normal distribution.

For a maximum event threshold $p_{max}$ and an event score threshold a a probability C that a number of terminations of the entity-to-entity subscription service will be less than $p_{max}$ may be expressed as:

$$Prob(\hat{P}_u(a) < p_{max}) = \phi\left(\frac{p_{max} - \hat{p}_u(a)}{\sigma}\right) = C$$

where: $\phi$ is a cumulative distribution function of the standard normal distribution and $\sigma$ is the standard deviation.

As shown, the user interface module 206 receives the analytics data 126 and processes the analytics data 126 to render indications in a user interface based on the analytics data 126. These indications are usable to modify aspects of the entity-to-entity subscription service to improve the subscription service. For example, an administrator of the entity-to-entity subscription service may modify content of communications sent to entities based on the rendered indications. In another example, the administrator of the entity-to-entity subscription service can modify a frequency in which communications are sent to the entities based on the rendered indications.

Figure 3:
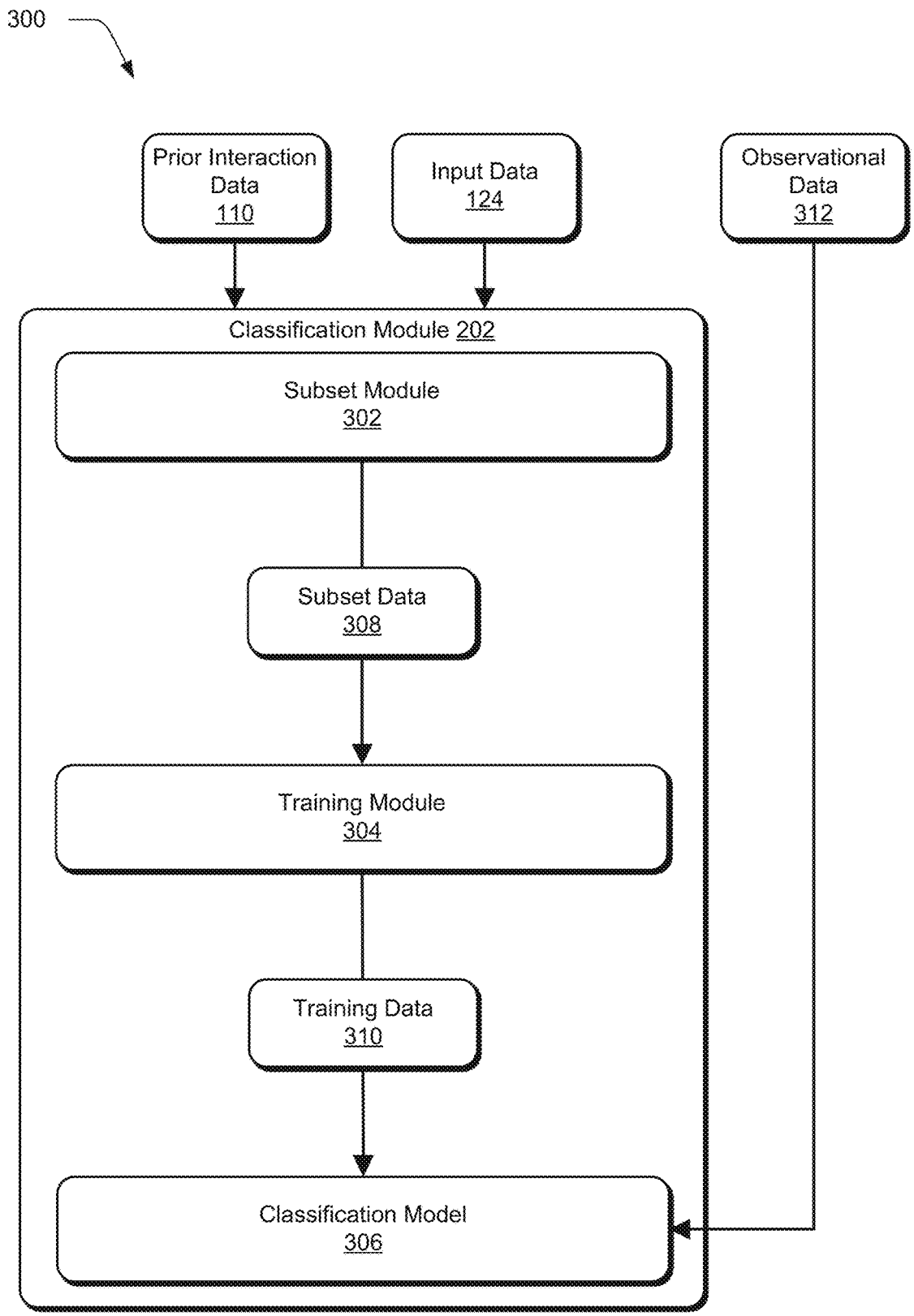
FIG. 3 depicts a system in an example implementation showing operation of a classification module for generating event score data.

FIG. 3 depicts a system 300 in an example implementation showing operation of a classification module 202 for generating event score data. The classification module 202 is illustrated to include a subset module 302, a training module 304, and a classification model 306. As shown, the subset module 302 receives the prior interaction data 110 and the input data 124 and processes the prior interaction data 110 and/or the input data 124 to generate subset data 308. The prior interaction data 110 describes time-stamped interactions of each of a plurality of entities with communications sent as part of an entity-to-entity subscription service. Examples of these time-stamped interactions include a communication is sent, a communication is delivered, a communication is opened, a hyperlink included in a communication is clicked, etc.

In one example, the input data 124 defines a period of time for predicting termination of the entity-to-entity subscription service. In this example, the subset module 302 leverages the period of time and the time-stamped interactions of each of the plurality of entities with the communications to generate the subset data 308. In a first example, the subset module 302 generates the subset data 308 on a time period by time period basis for each entity resulting in multiple rows of data for each entity (e.g., one row per time period). In a second example, the subset module 302 generates the subset data 308 on a per entity basis resulting in a single row of data for each entity.

As an example, for a period of time T, a prediction period may be expressed as:

$$[T+1, T+3]$$

where: T+1 is a period of time during which communications are sent to the entities by the entity-to-entity subscription service and a probability of termination up to and including T+3 is predicted. It is to be appreciated that the example of T+3 is intended to be representative of T+X such that X may be any positive number which can be user specified in one example.

A covariate period may be expressed as:

$$[T-\tau, T]$$

where: $\tau$ defines a historical period of time within which to consider prior interactions described by the prior interaction data 110. In one example, $\tau$ may be defined as 2T such that prior interactions of one period of time T are included in the subset data 308. In another example, T can be user specified.

In an example in which the entity-to-entity subscription service is an e-mail subscription service, the subset data 308 describes additional information such as e-mail level features which can include whether an e-mail communication is batch, or nurture, or program, etc. In this example, the subset data 308 describes entity level features such as professional title, original source type (e.g., source through which the entity subscribed to the subscription service), etc. As shown, the training module 304 receives the subset data 308 and processes the subset data 308 to generate training data 310.

The training module 304 generates the training data 310 in a format suitable for training the classification model 306. For example, the classification model 306 can implement different classification algorithms such using logistic regression. In one example, the classification model 306 implements a random forest classification algorithm. In another example, the classification model 306 implements a classification algorithm using gradient boosting such as using XGBoost. It is to be appreciated that the classification module 306 may implement a classification algorithm using any other suitable classification model.

The training module 304 generates the training data 310 to describe features for each type of interaction with the communications by each entity of the plurality of entities that receive the communications as part of the entity-to-entity subscription service. These features can include a frequency feature that indicates how many times a particular type of interaction with the communications occurred for each entity within the period of time defined by T–$\tau$. The frequency feature may also be defined with respect to sub-periods within T–$\tau$; e.g., T–$\tau1$, where $\tau1 < \tau$. These features can also include a recency feature that indicates how much time has passed since the last time, $\tau1$, or, $\tau$, a particular type of interaction with the communications occurred for each entity of the plurality of entities receiving the communications.

The classification model 306 is trained using the training data 310 to generate indications of termination of the entity-to-entity subscription service. For example, the classification model 306 is trained using the training data 310 in a 75:25 train:test split such that the classification model 306 is trained on 75 percent of the training data 310 and tested on 25 percent of the training data 310. The classification model 306 is illustrated as receiving observational data 312 in this example. The observational data 312 can describe observed terminations of the entity-to-entity subscription service. These observed terminations can be compared to predicted terminations of the entity-to-entity subscription service to further train the classification model 306, to validate a trained classification model 306, etc.

Example Datasets

The described systems and techniques have been validated on multiple datasets and are evaluated on Dataset 1 and Dataset 2. Dataset 1 includes interactions from multiple periods of time for each entity of the plurality of entities that receive communications as part of an entity-to-entity subscription service. In an example in which the period of time is equal to one week, then Dataset 1 includes multiple weeks of interaction data for each entity of the plurality of entities.

Dataset 2 includes approximately 32,000 entities and 950,000 interactions of the entities with communications sent as part of an entity-to-entity subscription service. In one example, Dataset 2 may have a class imbalance, e.g., between a class of entities that terminate the subscription service and a class of entities that do not terminate the subscription service. For example, the class imbalance may be addressed using a variety of techniques. In one example, the class imbalance can be addressed by oversampling the positive class (entities that do terminate the subscription service), e.g., and resampling. In an example, the class imbalance may be addressed by undersampling of the negative class (entities that do not terminate the subscription service) and resampling. For example, the class imbalance can be addressed using a weighting function applied to the positive class. In an example, the class imbalance may be addressed using a weighting function applied to the negative class.

In another example, Dataset 2 may consider only one period of time per entity. In this example, if the period of time is equal to one week, then Dataset 2 may consider the last week of data for entities that do not terminate the subscription service and the last week available for entities that terminate the subscription service. For example, Dataset 2 may include the last week of data from the resampled interaction data for the entities that do not terminate the subscription service and data from the resampled interaction data for the week of termination for entities that terminate the subscription service.

Figure 4A:
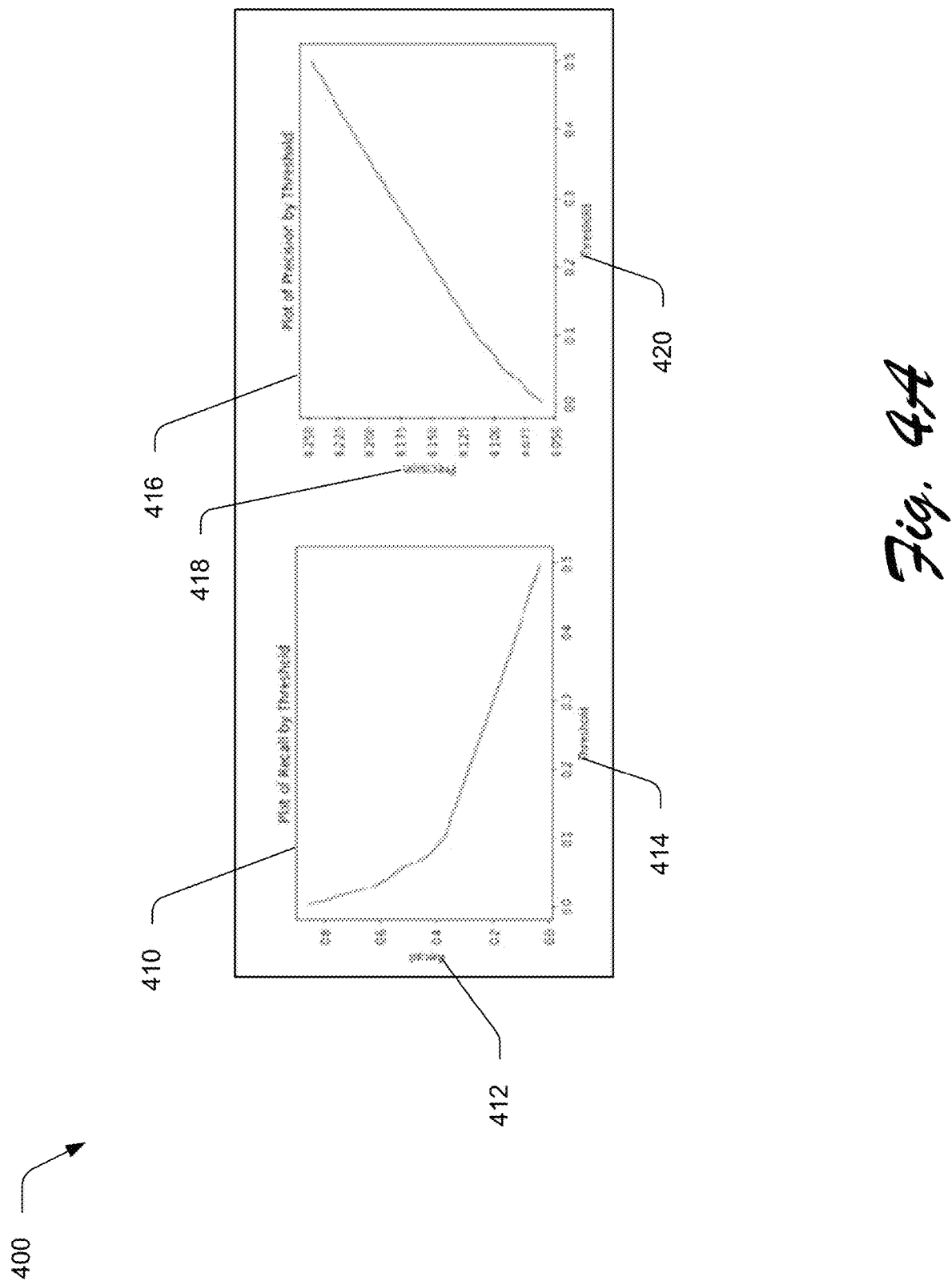
Figure 4B:
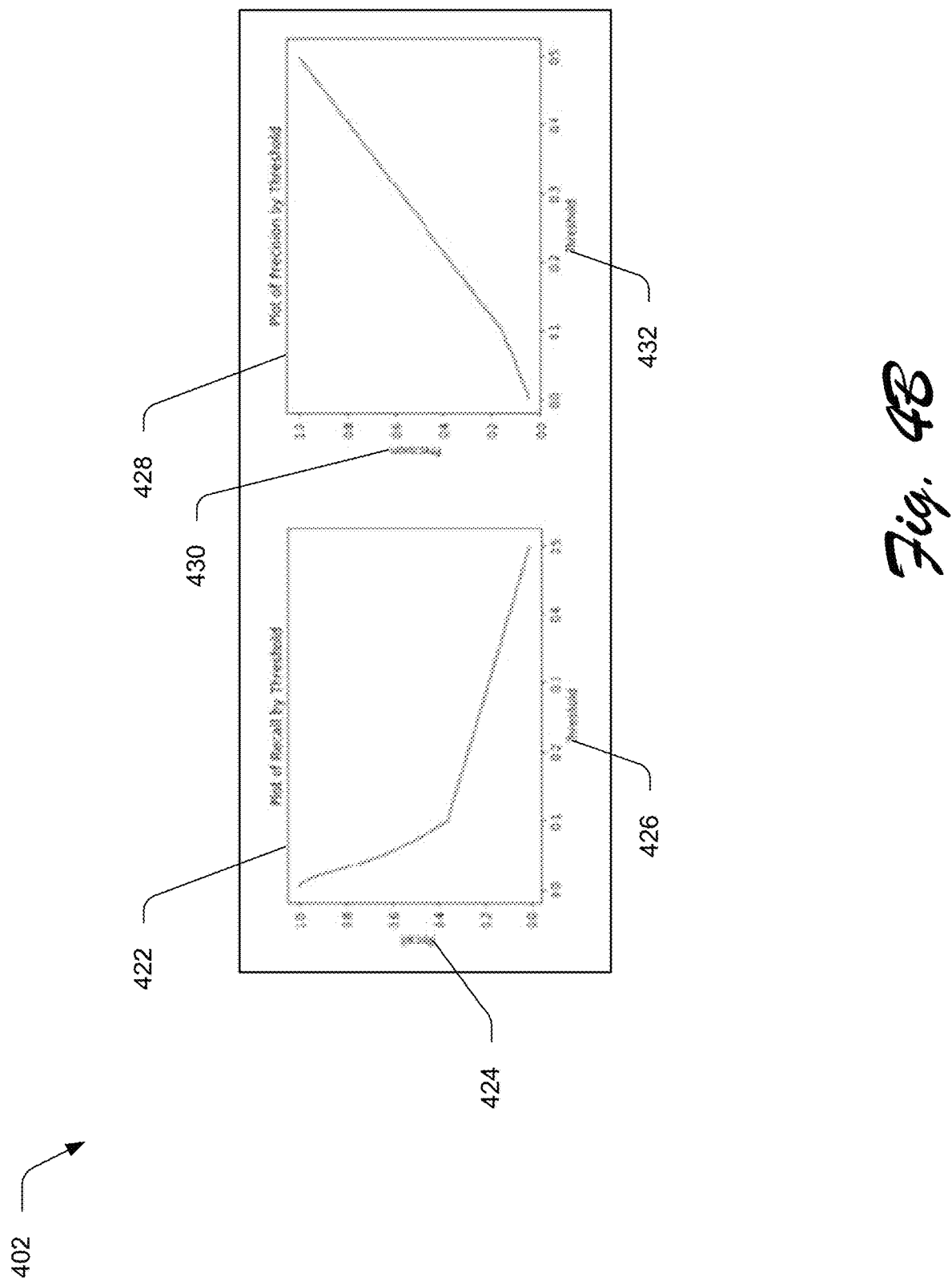

FIGS. 4A, 4B, 4C, 4D, and 4E are example representations of precision and recall versus a communication threshold of systems for predicting a terminal event. FIG. 4A illustrates a representation 400 of recall versus an event score threshold and precision versus the event score threshold on Dataset 1 using multiple time periods of interactions per entity and a classification model 306 implementing a random forest classification algorithm FIG. 4B illustrates a representation 402 of recall versus an event score threshold and precision versus the event score threshold on Dataset 1 using multiple time periods of interactions per entity and a classification model 306 implementing a classification algorithm using XGBoost.

Figure 4C:
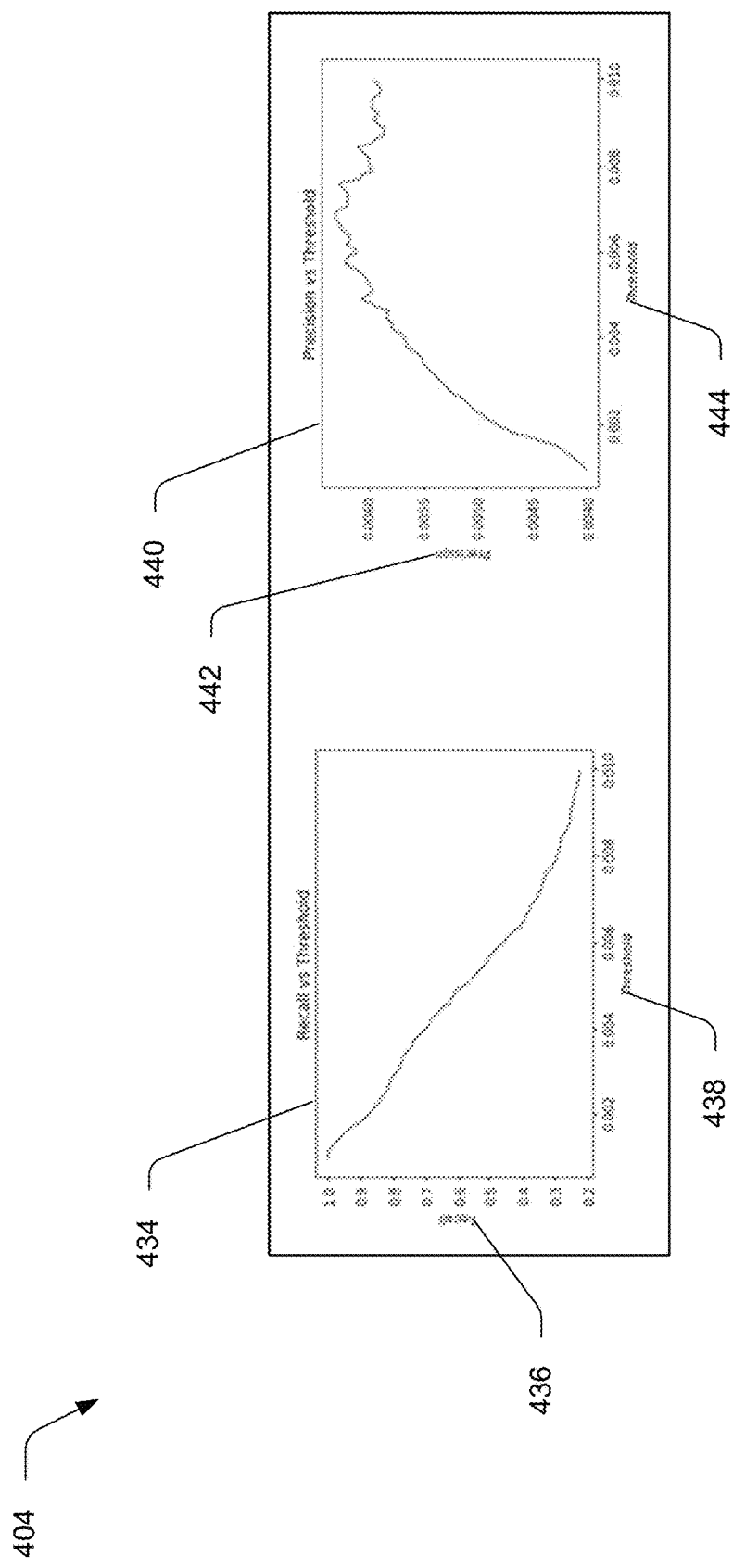
Figure 4D:
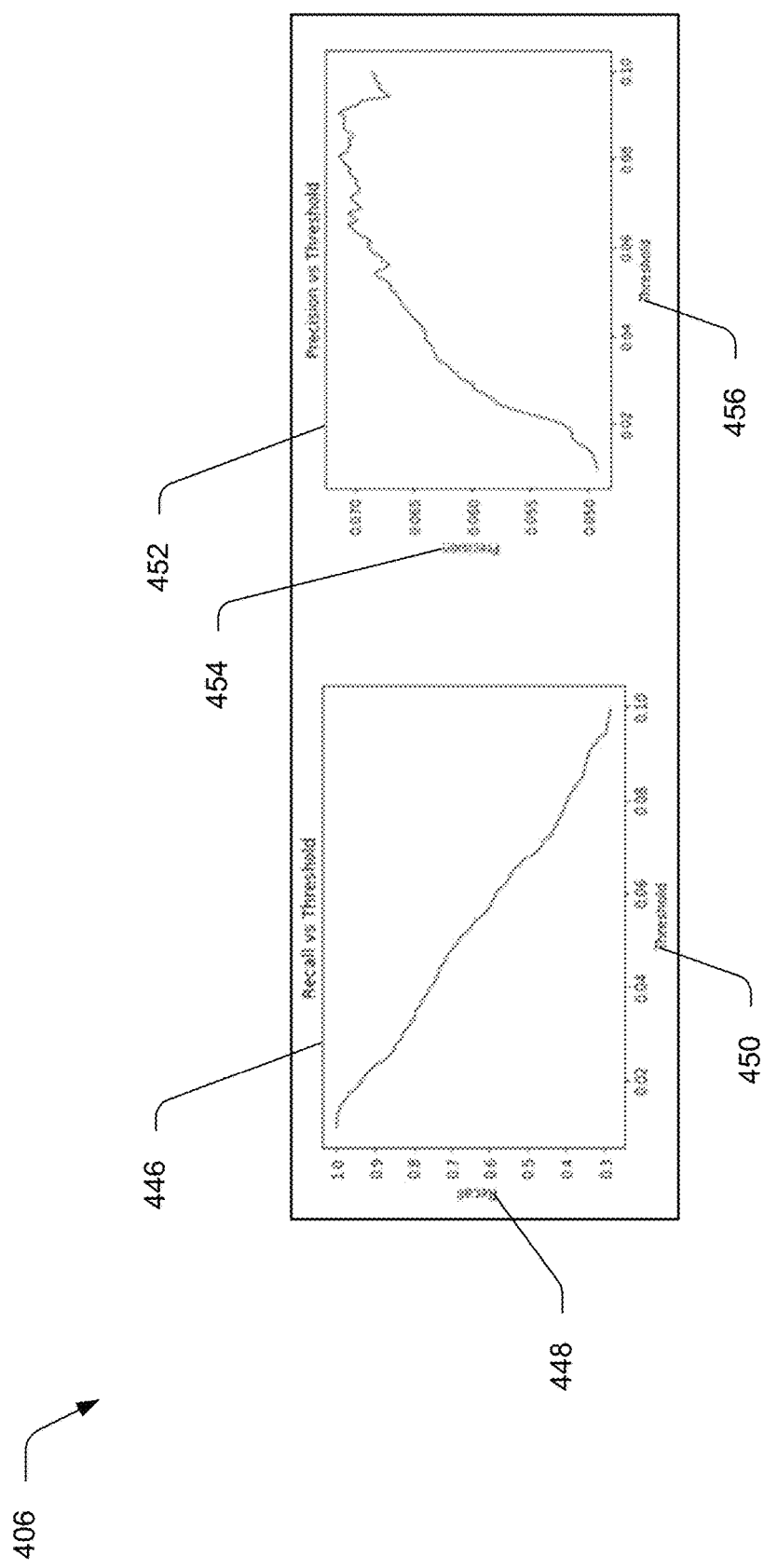

FIG. 4C illustrates a representation 404 of recall versus an event score threshold and precision versus the event score threshold on Dataset 2 using multiple time periods of interactions per entity and a classification model 306 implementing a classification algorithm using XGBoost without resampling. FIG. 4D illustrates a representation 406 of recall versus an event score threshold and precision versus the event score threshold on Dataset 2 using multiple time periods of interactions per entity and a classification model 306 implementing a classification algorithm using XGBoost with resampling. FIG. 4E illustrates a representation 408 of recall versus an event score threshold and precision versus the event score threshold on Dataset 2 using one time period of interactions per entity and a classification model 306 implementing a classification algorithm using XGBoost without resampling.

As shown in FIG. 4A, the representation 400 includes a recall plot 410 from Dataset 1 in an example in which the period of time is one week. The recall plot 410 presents recall 412 versus the event score threshold 414 based on multiple weeks of interaction data per entity. The representation 400 has an AUC of 0.72 in this example. The representation 400 also includes a precision plot 416 which presents precision 418 versus the event score threshold 420 based on multiple weeks of interaction data per entity.

The representation 402 illustrated in FIG. 4B includes a recall plot 422 from Dataset 1 in an example in which the period of time is one week. The recall plot 422 presents recall 424 versus the event score threshold 426 based on multiple weeks of interaction data per entity. In this example, the representation 402 has an AUC of 0.74 which is an improvement relative to the representation 400. The representation 402 also includes a precision plot 428. As shown, the precision plot 428 presents precision 430 versus the event score threshold 432 based on multiple weeks of interaction data per entity.

As illustrated in FIG. 4C, the representation 404 includes a recall plot 434 from Dataset 2 in which the period of time is one week. The recall plot 434 presents recall 436 versus the event score threshold 438 based on multiple weeks of interaction data per entity which is not resampled in this example. The representation 404 also includes a precision plot 440. The precision plot 440 presents precision 442 versus the event score threshold 444 based on multiple weeks of interaction data per entity which is not resampled.

The representation 406 shown in FIG. 4D includes a recall plot 446 from Dataset 2 in which the period of time is one week. As illustrated, the recall plot 446 presents recall 448 versus the event score threshold 450 based on multiple weeks of interaction data per entity which is resampled in the example shown in FIG. 4D. The representation 406 also includes a precision plot 452 which presents precision 454 versus the event score threshold 456 based on multiple weeks of interaction data per entity with resampling. A comparison of the recall plot 440 with the recall plot 452 demonstrates that resampling results in an improvement in precision.

As shown in FIG. 4E, the representation 408 includes a recall plot 458 from Dataset 2 in which the period of time is one week. The representation 408 has an AUC of about 0.76. The recall plot 458 presents recall 460 versus the event score threshold 462 based on one week of interaction data per entity without resampling. The representation 408 also includes a precision plot 464 which presents precision 466 versus the event score threshold 468 based on one week of interaction data per entity which is not resampled. As illustrated, for an event score threshold of 0.1 or 10 percent, the recall is about 0.79 and the precision is about 0.28. Thus, the representation 408 demonstrates that the described systems implemented using one week of interaction data per entity demonstrate better performance relative to systems implemented using multiple weeks of interaction data per entity.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

Figure 5:
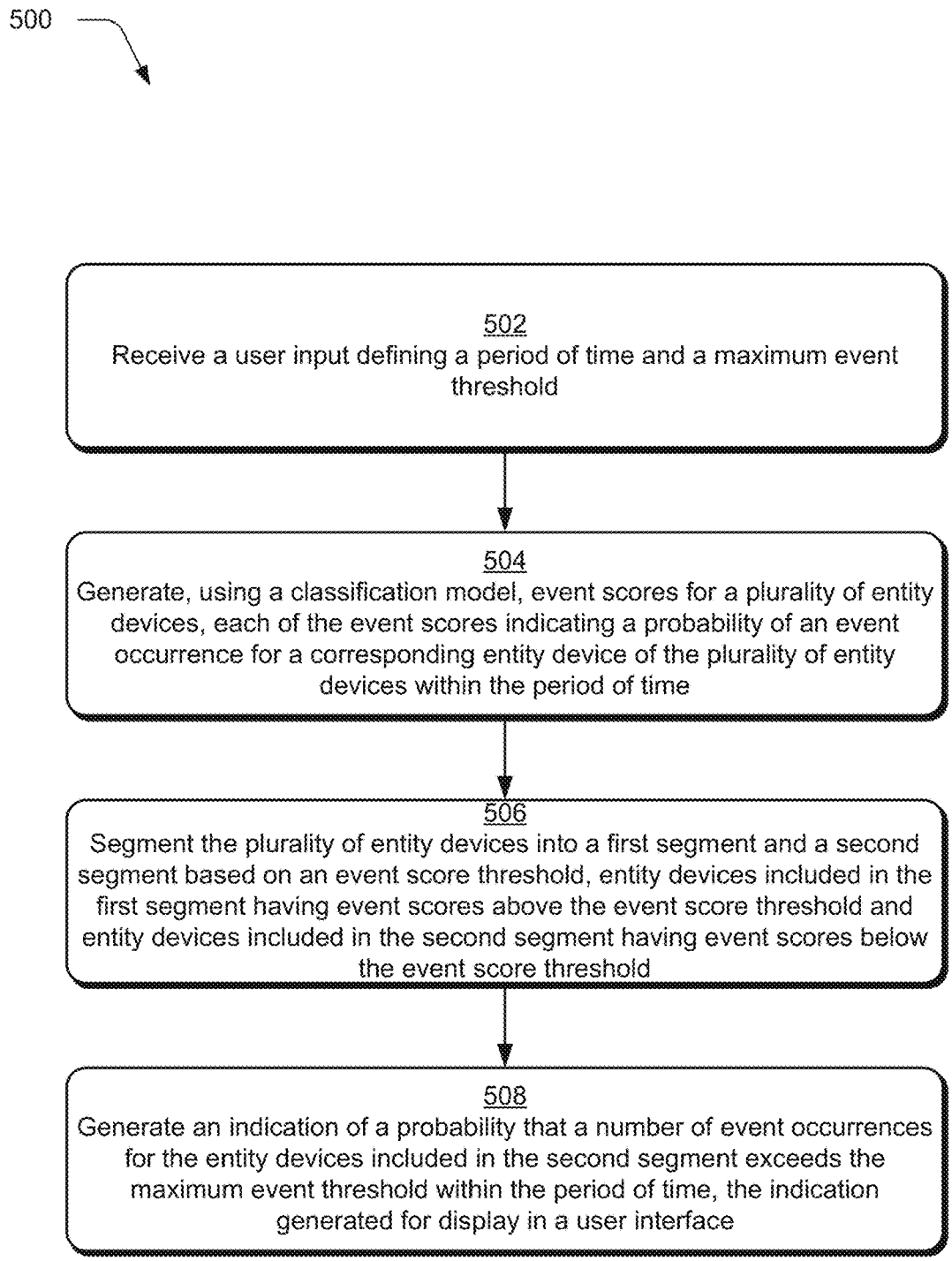
FIG. 5 is a flow diagram depicting a procedure in an example implementation in which a user input is received, a plurality of entity devices are segmented into a first segment and a second segment based on event scores for the plurality of entity devices, and an indication of a probability that a number of event occurrences for entity devices included in the second segment exceeds a maximum event threshold within a period of time is generated.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-4. FIG. 5 is a flow diagram depicting a procedure 500 in an example implementation in which a user input is received, a plurality of entity devices are segmented into a first segment and a second segment based on event scores for the plurality of entity devices, and an indication of a probability that a number of event occurrences for entity devices included in the second segment exceeds a maximum event threshold within a period of time is generated.

A user input defining a period of time and a maximum event threshold is received (block 502). The computing device 102 implements the termination module 108 to receive the user input in one example. Event scores are generated using a classification model for a plurality of entity devices, each of the event scores indicating a probability of an event occurrence for a corresponding entity device of the plurality of entity devices within the period of time (block 504). The termination module 108 can generate the event scores.

The plurality of entity devices are segmented into a first segment and a second segment based on an event score threshold, entity devices included in the first segment having event scores above the event score threshold and entity devices included in the second segment having event scores below the event score threshold (block 506). In an example, the computing device 102 implements the termination module 108 to segment the plurality of entity devices into the first segment and the second segment. An indication of a probability that a number of event occurrences for the entity devices included in the second segment exceeds the maximum event threshold within the period of time is generated (block 508), the indication generated for display in a user interface. The termination module 108 can generate the indication of the probability for display in the user interface.

Figure 6:
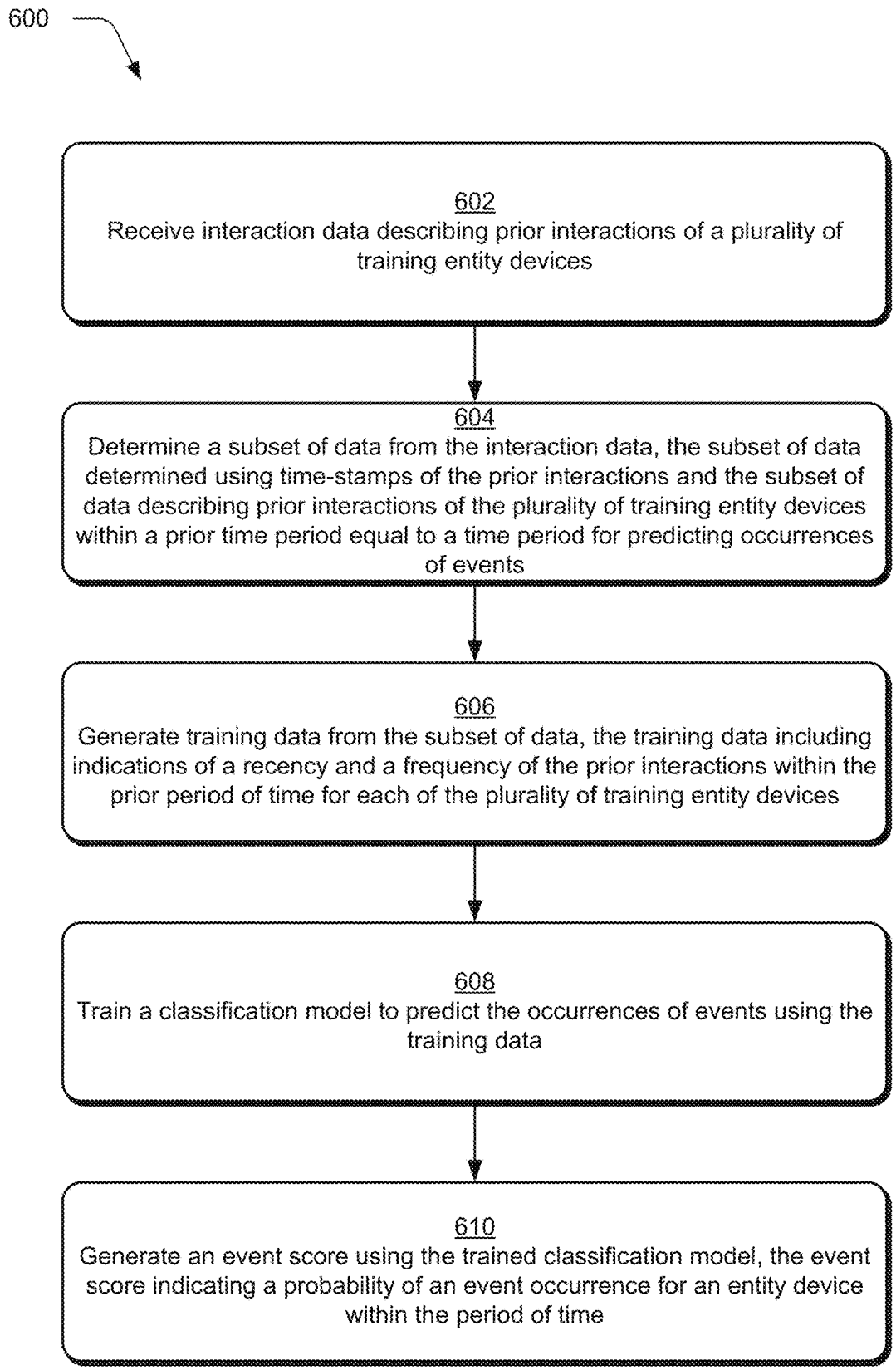
FIG. 6 is a flow diagram depicting a procedure in an example implementation in which a classification model is trained to predict occurrences of events.

FIG. 6 is a flow diagram depicting a procedure 600 in an example implementation in which a classification model is trained to predict occurrences of events. Interaction data describing prior interactions of a plurality of training entity devices is received (block 602). For example, the computing device 102 implements the termination module 108 to receive the interaction data. A subset of data is determined from the interaction data (block 604), the subset of data determined using time-stamps of the prior interactions and the subset of data describing prior interactions of the plurality of training entity devices within a prior time period equal to a time period for predicting occurrences of events. The termination module 108 can determine the subset of data.

Training data is generated from the subset of data (block 606), the training data including indications of a recency and a frequency of the prior interactions within the prior period of time for each of the plurality of training entity devices. The computing device 102 implements the termination module 108 to generate the training data in one example. A classification model is trained to predict the occurrences of events using the training data (block 608). The termination module 108 may train the classification module to predict the occurrences of events. An event score is generated using the trained classification model (block 610), the event score indicating a probability of an event occurrence for an entity device within the period of time. For example, the computing device 102 implements the termination module 108 to generate the event score.

Example System and Device

Figure 7:
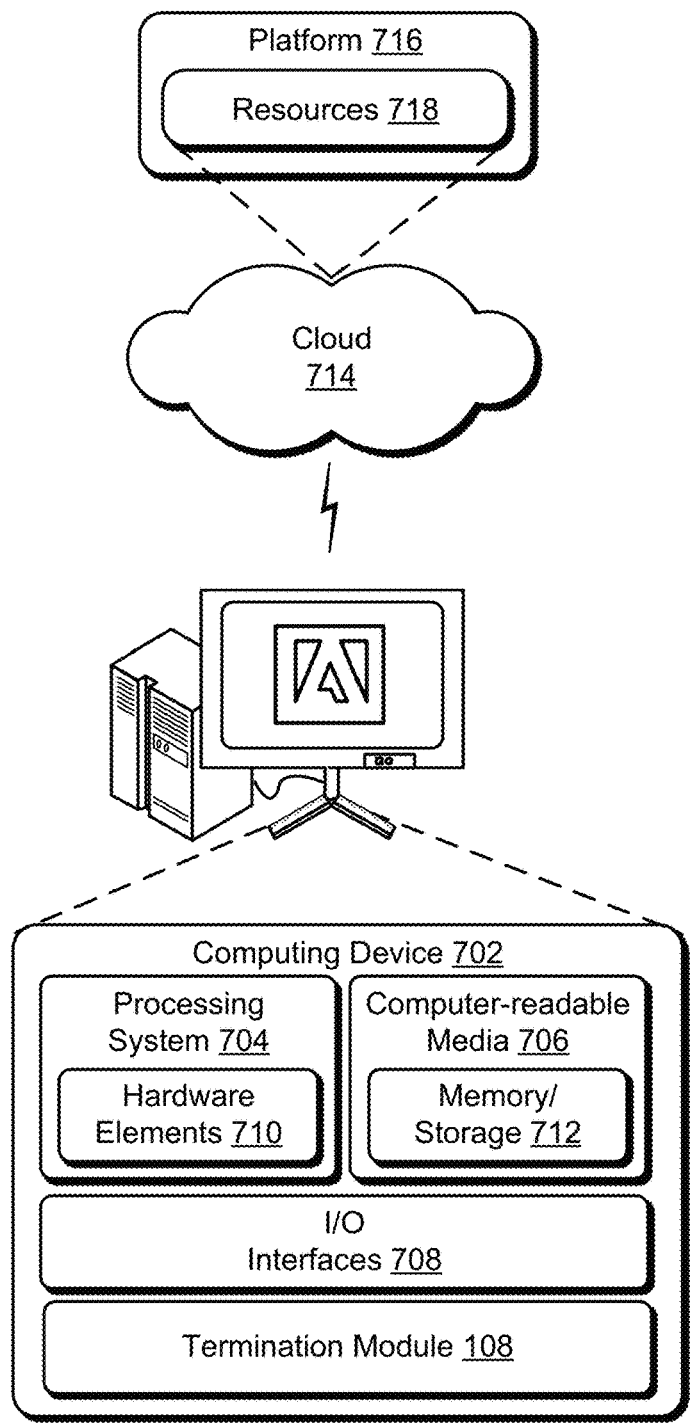
FIG. 7 illustrates an example system that includes an example computing device that is representative of one or more computing systems and/or devices that may implement the various techniques described herein.

FIG. 7 illustrates an example system 700 that includes an example computing device that is representative of one or more computing systems and/or devices that may implement the various techniques described herein. This is illustrated through inclusion of the termination module 108. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources 718 and functions to connect the computing device 702 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although implementations of systems for predicting a terminal event have been described in language specific to structural features and/or methods, it is to be understood that the appended claims are not necessarily limited to the specific features or methods described. Rather, the specific features and methods are disclosed as example implementations of systems for predicting a terminal event, and other equivalent features and methods are intended to be within the scope of the appended claims. Further, various different examples are described and it is to be appreciated that each described example can be implemented independently or in connection with one or more other described examples.

What is claimed is:

1. A method implemented by a computing device, the method comprising:
   receiving, by the computing device, a user input via a user interface, the user input defining a period of time and a first threshold defining a maximum event threshold as an accepted level of terminations of an entity-to-entity subscription service;
   receiving, by the computing device, data describing a plurality of entity devices;
   generating, by the computing device using a classification model based on the data, event scores for a plurality of entity devices, each of the event scores indicating a probability of an event occurrence for a corresponding entity device of the plurality of entity devices within the period of time;
   segmenting, by the computing device, the plurality of entity devices into a first segment and a second segment based on a second threshold defining an event score threshold, entity devices included in the first segment having event scores above the event score threshold and entity devices included in the second segment having event scores below the event score threshold; and
   generating, by the computing device, an indication of a probability that a number of event occurrences for the entity devices included in the second segment exceeds the first threshold defining the maximum event threshold within the period of time, the indication generated for display in the user interface.

2. The method as described in claim 1, wherein the classification model includes at least one of a logistic regression model, a random forest model, or an XGBoost model.

3. The method as described in claim 1, further comprising forming communications for receipt by the entity devices included in the second segment.

4. The method as described in claim 3, wherein the communications are e-mail communications of an entity-to-entity subscription service.

5. The method as described in claim 4, wherein the event occurrences for the entity devices included in the second segment are terminations of the entity-to-entity subscription service.

6. The method as described in claim 1, wherein the classification model is trained using training data describing prior interactions of training entity devices during a prior time period equal to the period of time.

7. The method as described in claim 6, wherein the training data describes a positive class of the training entity devices for event occurrences during the prior time period and a negative class of the training entity devices for event non-occurrences during the prior time period.

8. The method as described in claim 7, wherein the training data is generated by undersampling the negative class of the training entity devices, oversampling the positive class of the training entity devices, or using a weighting function.

9. The method as described in claim 1, further comprising generating an indication of an average number of event occurrences for the entity devices included in the second segment during the period of time.

10. A system comprising:
a termination module implemented at least partially in hardware of a computing device to:
receive interaction data describing prior interactions of a plurality of training entity devices;
receive input data describing a user input defining a period of time for predicting occurrences of events;
determine a subset of data from the interaction data, the subset of data determined using time-stamps of the prior interactions and the subset of data describing prior interactions of the plurality of training entity devices within a prior time period equal to the period of time for predicting occurrences of events;
generate training data from the subset of data, the training data including indications of a recency and a frequency of the prior interactions within the prior period of time for each of the plurality of training entity devices;
train a classification model to predict the occurrences of events using the training data; and
generate an event score using the trained classification model, the event score indicating a probability of an event occurrence for an entity device within the period of time as exceeding a maximum event threshold that defines an accepted level of terminations of an entity-to-entity subscription service.

11. The system as described in claim 10, wherein the classification model includes at least one of a logistic regression model, a random forest model, or an XGBoost model.

12. The system as described in claim 10, wherein the termination module is further implemented to form a communication for receipt by the entity device.

13. The system as described in claim 12, wherein the communication is an e-mail communication of an entity-to-entity subscription service.

14. The system as described in claim 13, wherein the event occurrence is a termination of the entity-to-entity subscription service.

15. One or more non-transitory computer-readable storage media comprising instructions stored thereon that, responsive to execution by a computing device causes the computing device to perform operations including:
receiving a user input via a user interface, the user input defining a period of time and a first threshold defining a maximum event threshold as an accepted level of terminations of an entity-to-entity subscription service;
receiving, by the computing device, data describing a plurality of entity devices;
generating event scores for a plurality of entity devices using a classification model based on the data, each of the event scores indicating a probability of an event occurrence for a corresponding entity device of the plurality of entity devices within the period of time;
segmenting the plurality of entity devices into a first segment and a second segment based on a second threshold defining an event score threshold, entity devices included in the first segment having event scores above the event score threshold and entity devices included in the second segment having event scores below the event score threshold; and
generating, by the computing device, an indication of a probability that a number of event occurrences for the entity devices included in the second segment exceeds the first threshold defining the maximum event threshold within the period of time, the indication generated for display in the user interface.

16. The one or more non-transitory computer-readable storage media as described in claim 15, wherein the classification model includes at least one of a logistic regression model, a random forest model, or an XGBoost model.

17. The one or more non-transitory computer-readable storage media as described in claim 15, the operations further including forming communications for receipt by the entity devices included in the second segment.

18. The one or more non-transitory computer-readable storage media as described in claim 17, wherein the communications are e-mail communications of an entity-to-entity subscription service.

19. The one or more non-transitory computer-readable storage media as described in claim 18, wherein the event occurrences for the entity devices included in the second segment are terminations of the entity-to-entity subscription service.

20. The one or more non-transitory computer-readable storage media as described in claim 15, wherein the classification model is trained using training data describing prior interactions of a plurality of training entity devices during a prior period of time equal to the period of time.

* * * * *